United States Patent
Huh et al.

(10) Patent No.: US 7,092,037 B2
(45) Date of Patent: Aug. 15, 2006

(54) METHOD OF CONVERTING COLOR TEMPERATURES IN IMAGE DISPLAY DEVICE USING CONTENTS DESCRIPTION METADATA OF VISUAL CONTENTS AND SYSTEM USING THE SAME

(75) Inventors: Young-sik Huh, Kyungki-do (KR); Du-sik Park, Kyungki-do (KR); Ki-won Yoo, Seoul (KR); Sang-kyun Kim, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 535 days.

(21) Appl. No.: 10/376,235

(22) Filed: Mar. 3, 2003

(65) Prior Publication Data

US 2003/0202121 A1    Oct. 30, 2003

(30) Foreign Application Priority Data

Apr. 25, 2002    (KR) ............................... 2002-22807

(51) Int. Cl.
*H04N 9/73*    (2006.01)
(52) U.S. Cl. .................................... 348/655
(58) Field of Classification Search ............... 348/656, 348/657, 638–654, 655, 661, 659, 223.1, 348/225.1; 345/603, 604, 589, 590, 591; 396/225; 358/516, 518
See application file for complete search history.

(56) References Cited

U.S. PATENT DOCUMENTS

| | | | |
|---|---|---|---|
| 4,562,460 A | 12/1985 | Harwood | |
| 4,633,299 A | 12/1986 | Tanaka | |
| 4,685,071 A | 8/1987 | Lee | |
| 4,788,586 A | 11/1988 | Eckenbrecht | |
| 4,823,184 A * | 4/1989 | Belmares-Sarabia et al. | 348/650 |
| 4,866,511 A * | 9/1989 | Belmares-Sarabia et al. | 348/650 |
| 5,495,428 A | 2/1996 | Schwartz | |
| 6,172,719 B1 | 1/2001 | Kim | |

FOREIGN PATENT DOCUMENTS

| | | |
|---|---|---|
| CN | 1241098 A | 1/2000 |
| CN | 1324188 A | 11/2001 |
| KR | 2000-0038213 A | 7/2000 |
| KR | 2000-0046716 A | 6/2001 |

OTHER PUBLICATIONS

Chinese Office Action.

* cited by examiner

*Primary Examiner*—Michael H. Lee

(57) ABSTRACT

Provided are a method of and a system for converting color temperatures of visual contents to user's preferred color temperatures by using metadata of the visual contents. The system includes an image color temperature recording unit, a user preferable color temperature managing unit, and a color temperature adjusting unit. The image color temperature recording unit time-divides the visual contents according to a color temperature description format, estimates color temperatures of time-divided sections, and records the estimated color temperatures as first metadata. The user preferable color temperature managing unit determines user's preferable color temperatures of the time-divided sections, records the user's preferable color temperatures as second metadata, and outputs the user's preferable color temperatures. The color temperature adjusting unit converts the estimated color temperatures of the first metadata based on the user's preferable color temperatures of the second metadata.

18 Claims, 4 Drawing Sheets

METHOD OF CONVERTING COLOR TEMPERATURES IN IMAGE DISPLAY DEVICE USING CONTENTS DESCRIPTION METADATA OF VISUAL CONTENTS AND SYSTEM USING THE SAME

BACKGROUND OF THE INVENTION

This application claims the priority of Korean Patent Application No. 2002-22807 filed on Apr. 25, 2002 in the Korean Intellectual Property Office, the disclosure of which is incorporated herein in its entirety by reference.

1. Field of the Invention

The present invention relates to a method of and a system for converting color temperatures of visual contents according to a user's preferred color temperature.

2. Description of the Related Art

The color temperature of a light source is defined as the temperature of the planckian radiator, which chromaticity is nearest to that of the source in a suitable uniform chromaticity-scale diagram such as CIE 1960 UCS diagram. The color temperature of an image can be calculated by estimating illumination component of the image. Color Temperature can be used to quantifying the warmness and coolness that a human being feels about the image. In general, an image having a high color temperature is wholly bluish and an image having a low color temperature is wholly reddish. However, individuals' preferred color temperatures are different.

As disclosed in U.S. Pat. Nos. 4,562,460, 4,633,299, and 4,788,586, in the prior arts, in order to convert the color temperature of an image to a user's preferred color temperature, a television or a monitor has an adjusting circuit which can vary the quantity of hue or red, green, blue (RGB) and with which the user can adjust the color temperature of an image or a scene to the user's preferred color temperature.

However, it is very inconvenient for the user to adjust the color temperature each time the user watches a moving picture containing scenes of various contents. Also, in the color temperature converting method, it appears as if converted pictures have passed through a specific color filter. Thus, the displayed pictures look unnatural.

As another color temperature converting method, U.S. Pat. No. 6,172,719 discloses a method of sensing the brightness, color, etc. around a display device and automatically converting the color temperature of the display device using a chromaticity sensing apparatus. In this method, the color temperature is converted according to environmental changes regardless of the characteristics of the picture. Thus, this method is suitable to adjusting a viewer's feelings depending on the environment while being unrelated to the conversion of color temperature according to color temperature characteristics of the visual contents. In general, the environment for watching an image display device, such as a television or a monitor, is constant while the visual contents are inconstant. Thus, when considering that individuals' preferred color temperatures are different, it is necessary to convert the color temperature to correspond to variations in the visual contents.

For this necessity, U.S. Pat. Nos. 4,685,071 and 5,495,428 and Korean Patent Application No.1998-53119 each disclose a method of estimating the color temperature (a luminating color) from an image. Specifically, Korea Patent Application No.1999-50596 discloses a method of simultaneously converting color temperatures of images to a user's preferred color temperatures using estimated color temperatures.

However, these methods have to undergo a color temperature estimating process in which a matrix multiplication operation is performed for each pixel. Thus, when these methods are applied to a user's terminal, a considerable amount of calculation load occurs. As a result, image displaying performance deteriorates, or the cost for improving the image displaying performance increases.

SUMMARY OF THE INVENTION

Accordingly, the present invention provides a method and a system for converting color temperatures by which a calculation load resulting from estimating color temperatures in a user's terminal can be removed by pre-estimating the color temperatures of visual contents in a visual content provider/broadcaster or the user's terminal and recording the estimated color temperatures at every predetermined period of time following various content description metadata standards including MPEG-7 or a separate format, and obtaining the color temperatures of the visual contents directly from a corresponding metadata, and applying the obtained color temperatures and user's preferred color temperatures to color temperature conversion when displaying the visual contents in the user's terminal.

The present invention provides a method and a system for automatically converting color temperatures without requiring a user's preferred color temperature to be input for each of the visual contents, by recording the color temperatures of the visual contents that the user previously watched and applying the recorded color temperatures to the conversion of color temperatures of visual contents that the user is now watching.

According to an aspect of the present invention, there is provided a system for converting color temperatures of visual contents to user's preferable color temperatures. The system includes an image color temperature recording unit, a user preferable color temperature managing unit, and a color temperature adjusting unit. The image color temperature recording unit time-divides the visual contents according to a color temperature description format, estimates color temperatures of time-divided sections, and records the estimated color temperatures as first metadata. The user preferable color temperature managing unit determines user's preferable color temperatures of the time-divided sections, records the user's preferable color temperatures as second metadata, and outputs the user's preferable color temperatures. The color temperature adjusting unit converts the estimated color temperatures of the first metadata based on the user's preferable color temperatures of the second metadata.

According to another aspect of the present invention, there is also provided a method of converting color temperatures of visual contents to user's preferable color temperatures. The visual contents are time-divided according to a color temperature description format and color temperatures of time-divided sections are estimated. The estimated color temperatures and information about the time-divided sections are recorded as first metadata. The first metadata is analyzed, user's preferable color temperatures of the time-divided sections are determined based on analyzed estimated color temperatures and the information about the time-divided sections, and the information about the time-divided sections and the user's preferable color temperatures of the time-divided sections are recorded as second metadata. The second metadata is analyzed and the estimated color temperatures of the time-divided sections of the visual contents are converted based on the user's preferable color temperatures of the time-divided sections.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will now be described with the attached drawings.

Figure 1:
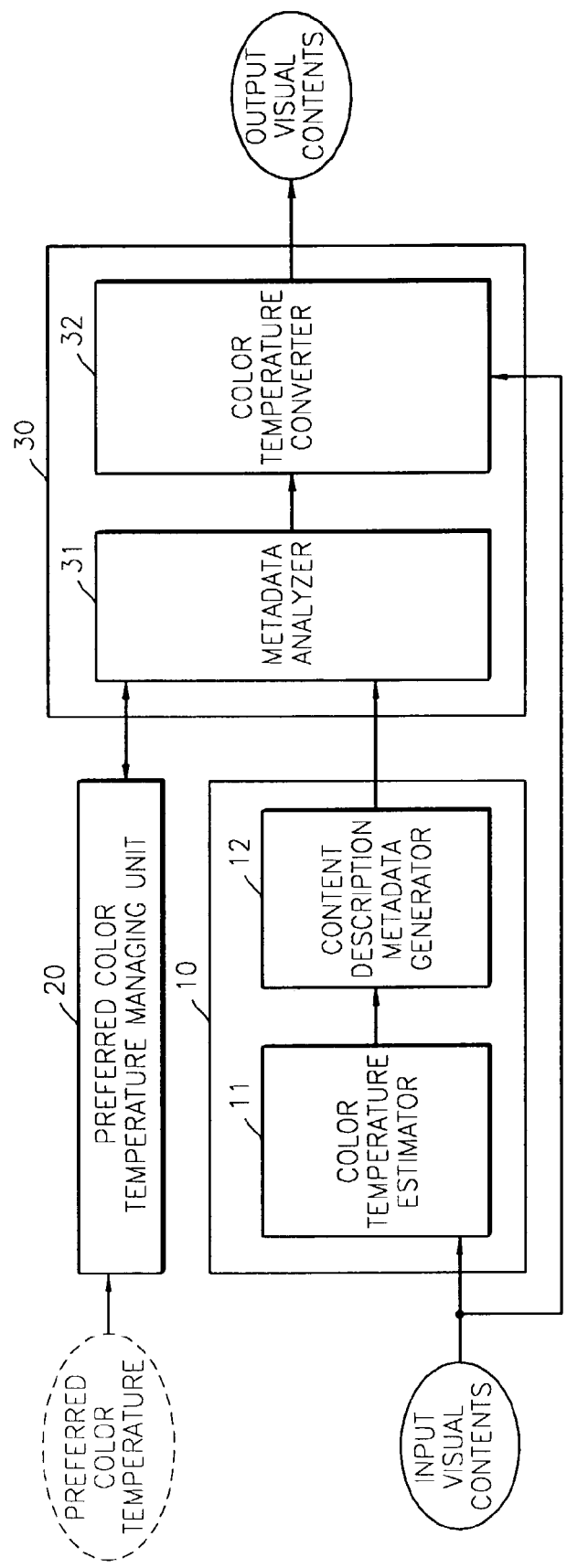
FIG. 1 is a block diagram of the structure of a color temperature converting system according to a preferred embodiment of the present invention.

FIG. 1 is a block diagram of the structure of a color temperature converting system according to a preferred embodiment of the present invention. Referring to FIG. 1, the color temperature converting system includes an image color temperature recording unit 10 which estimates the color temperatures of visual contents and records the color temperatures as metadata, a preferred color temperature managing unit 20 which determines a user's preferred color temperatures, and a color temperature adjusting unit 30 which analyzes the metadata and converts the color temperatures of the visual contents.

The image color temperature recording unit 10 includes a color temperature estimator 11 and a content description metadata generator 12. The color temperature estimator 11 time-divides the visual contents according to a pre-set or input color temperature description format and estimates the color temperature of each time-divided section. The content description metadata generator 12 records information on the time-divided sections of the visual contents and the estimated color temperatures that are received from the color temperature estimator 11 as metadata according to a predetermined format.

The color temperature adjusting unit 30 includes a metadata analyzer 31 and a color temperature converter 32. The metadata analyzer 31 analyses information on the time-divided sections and information on the color temperatures of the time-divided sections from the input metadata, provides information on the color temperatures of the time-divided sections of current visual contents and an identifier of the current visual contents to the user preferred color temperature managing unit 20, receives a user's preferred color temperatures as determined by the user preferred color temperature managing unit 20, and outputs time-divided section information, color temperature information on each time-divided section, and the user's preferred color temperatures of the input visual contents. The color temperature converter 32 converts the color temperatures of the time-divided sections of the input visual contents according to the user's preferred color temperatures.

The image color temperature recording unit 10, the user preferred color temperature managing unit 20, and the color temperature adjusting unit 30 can be realized and operated as physically separated systems or apparatuses. For example, the image color temperature recording unit 10 may be realized in an image service provider's system, and the user preferred color temperature managing unit 20 and the color temperature adjusting unit 30 may be realized in a user's terminal to constitute the color temperature converting system of the present invention. Also, the image color temperature recording unit 10, the user preferred color temperature managing unit 20, and the color temperature adjusting unit 30 can be realized and operated in the user's terminal.

However, the operations performed by the image color temperature recording unit 10 of time-dividing the input visual contents, estimating the color temperatures of the time-divided sections, and recording the color temperatures as the metadata are temporarily separated from operations performed by the color temperature adjusting unit 30' of analyzing the metadata and converting the color temperatures of the time-divided sections. In other words, before the visual contents are displayed via an image display device of the user's terminal, the image color temperature recording unit 10 generates metadata of the entire visual contents, and then the generated metadata is output to the color temperature adjusting unit 30 when the visual contents are requested to be displayed via the image display device. Since the color temperature adjusting unit 30 converts color temperatures using the received metadata without first estimating the color temperatures, the time required for converting the color temperatures in the user's terminal can be sharply reduced.

Hereinafter, a color temperature converting process according to the present invention will now be described with reference to FIG. 2.

Figure 2:
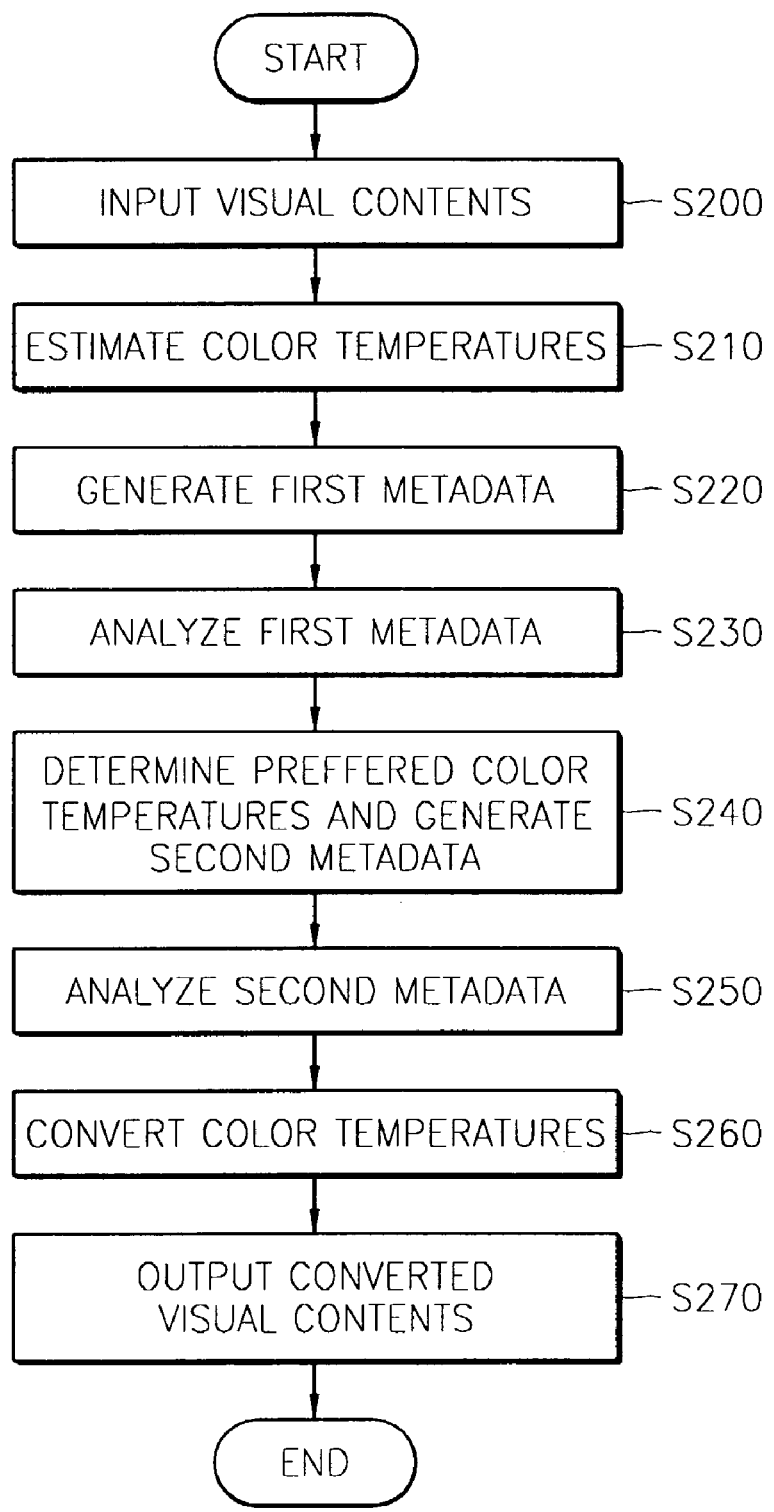
FIG. 2 is a flowchart explaining a color temperature converting method according to the preferred embodiment of the present invention.

FIG. 2 is a flowchart explaining a color temperature converting process according to the preferred embodiment of the present invention.

In step S200, in order to display input image data on the image display device of the user's terminal, before the input image data is displayed on the image display device, the input image data is input to the color temperature estimator 11 which is realized in the image service provider's system or the user's terminal.

Figure 3:
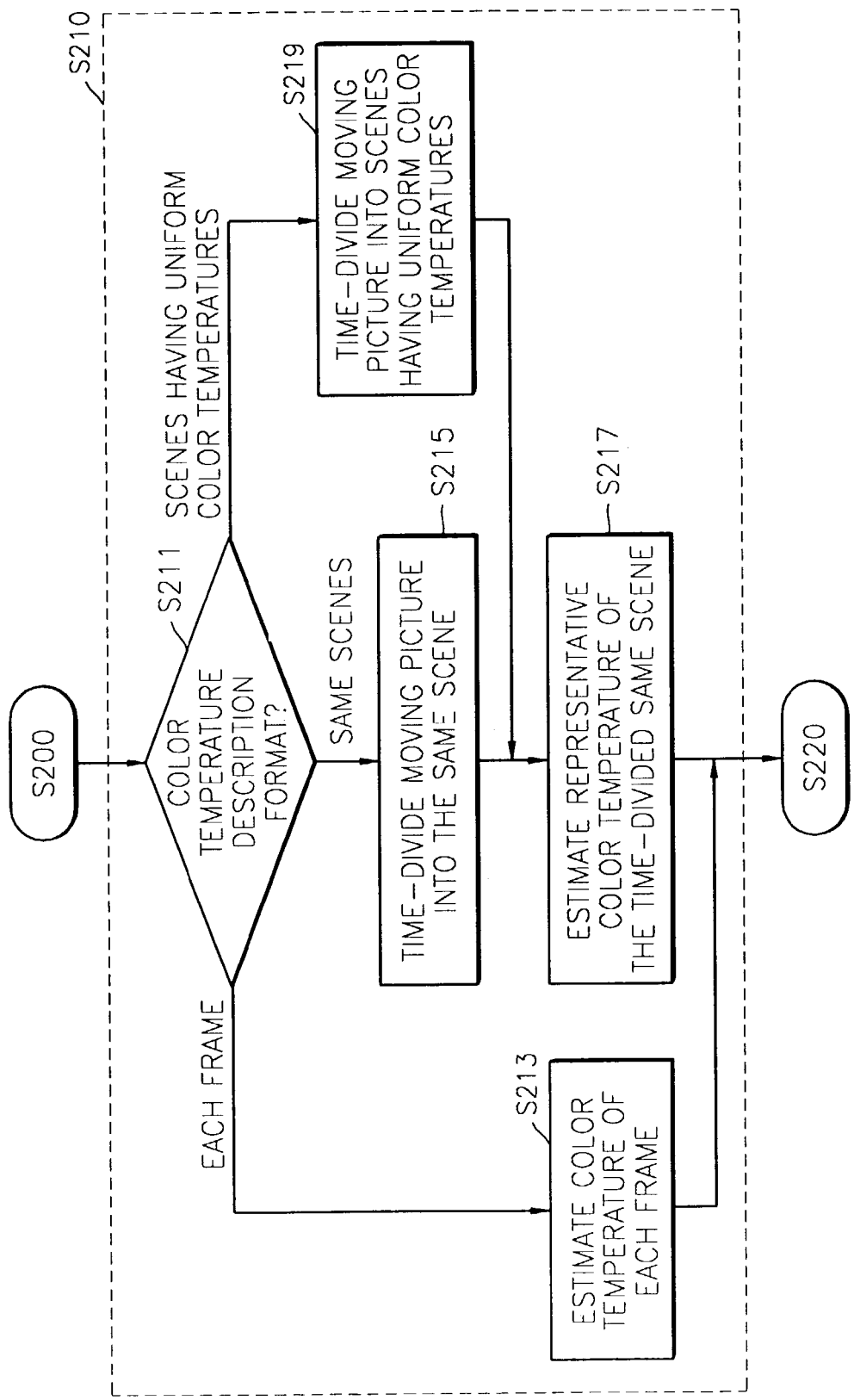
FIG. 3 is a flowchart explaining a color temperature estimating process of FIG. 2 in detail.

In step S210, the color temperature estimator 11 time-divides the input moving pictures according to the color temperature description format and estimates the color temperatures of the time-divided sections. The color temperature estimating process will now be described in detail with reference to FIG. 3.

The input moving pictures can be selectively time-divided into frames, into successive same scenes in the moving pictures or into successive scenes in the moving pictures having uniform color temperatures according to the color temperature description format. This color temperature description format can be pre-defined according to a predetermined format or can be appropriately selected according to the type of moving picture. If an input image is a single still picture not a moving picture, the input image is time-divided into frames.

First, in step S211, the color temperature estimator 11 determines how an input color temperature description format or a color temperature description format pre-defined in a system time-divides the input image.

If the color temperature description format is set to time-divide the input image into frames, the color temperature estimator 11 estimates the color temperatures of the frames of the input moving picture. Much research on methods of estimating luminating colors (color temperatures) from an image has been carried out. The representative methods are disclosed in U.S. Pat. Nos. 4,685,071 and 5,495,428, and Korea Patent Application Nos. 1998-53119 and 1999-50896, filed by the applicant of the present invention. These patents or documents relate to methods of extracting luminating colors from images using highlight or similar information on the images. The luminating colors or color temperatures extracted via these methods are expressed in a CIE XYZ color space or by a spectrum curve.

The color temperature estimator 11 can estimate the color temperature of one frame using any one of the methods disclosed in the above-mentioned documents. Preferably, in step S213, the color temperature is estimated using a color temperature estimating method disclosed in Korea Patent Application No. 1999-50596, filed by the applicant of the present invention and incorporated by reference herein.

If the color temperature description format is set to time-divide the moving picture into same scenes, the color temperature estimator 11 time-divides the input moving picture data into same scenes in step S215 and estimates representative color temperatures of the divided same scenes in step S217.

To time-divide the moving picture into successive identical scenes, first, it is determined whether a frame shows the same scene. The method of determining whether the frame shows the same scene includes many methods such as: obtaining a color histogram of each frame, obtaining and analysing the difference in color histograms between adjacent frames, using an edge characteristic of each frame, using motion vectors, etc. In step S215, the moving picture is time-divided into a temporarily successive singular or a plurality of frames which have been determined as showing the same scene.

A representative color temperature in an same scene section can be estimated by the following methods: (i) selecting a first frame of the same scenes as a representative frame, periodically selecting one of a plurality of predetermined frames as a representative frame, or selecting a representative frame by another method and then estimating a color temperature of the selected representative frame as a representative color temperature and (ii) estimating/calculating a statistical representative value, such as an average value, from color temperature values of all or some of the frames in time-divided sections and then estimating the statistical representative value as a representative color temperature. In step S217, the method of estimating the color temperature of the representative frame or color temperatures of some of the frames in the time-divided sections may be identical to the above-described method of estimating color temperatures of the frames when time-dividing the moving picture into frames.

If the color temperature description format is set to time-divide the moving picture into scenes having uniform color temperatures, the color temperature estimator 11 time-divides the moving picture into scenes having uniform color temperatures in step S219 and estimates a representative color temperature by the same method as when time-dividing the moving picture into the same scene, in step S217.

To time-divide the moving picture into scenes having uniform color temperatures, it is determined which frames are included in the uniform color temperature scenes. Successive uniform color temperature scenes in the moving picture are composed of a temporarily successive singular or plurality of frames satisfying one of the following requirements: (i) after dividing the range of a color temperature into several sections, when color temperatures of two temporarily successive frames belong to the same color temperature section, (ii) when the difference between the color temperatures of two temporarily successive frames is less than a predetermined threshold value, and (iii) when frames between $n^{th}$ and $n+k^{th}$ frames, except the predetermined number of frames, satisfies (i) or (ii) (for example, the color temperatures of the frames between the $n^{th}$ and $n+k^{th}$ frames satisfies 2000±20(K°), when 2–3 frames of the frames between the $n^{th}$ and $n+k^{th}$ frames have color temperatures exceeding 2000±20(K°), the 2–3 frames are included in the predetermined number of frames). The color temperature estimator 11 time-divides the input moving picture into scenes having uniform color temperatures according to the above-described conditions.

In step s220, the color temperatures of the time-divided sections of the input image estimated according to the above-described color temperature estimating process are output to the content description metadata generator 12 together with information on the time-divided sections, and the content description metadata generator 12 generates the estimated color temperatures and the time-divided section information as first metadata according to content description standards, such as MPEG-7, MPEG-21, etc., content description apparatuses, or formats prescribed in a content description service and outputs the first metadata to the metadata analyser 31 when the input image is requested to be displayed in the user's image display device.

In step S230, the metadata analyzer 31 analyzes the received first metadata and outputs the time-divided section information of the moving picture, information on the representative color temperatures of the time-divided section, and the identifier of the input visual contents to the user preferred color temperature managing unit 20.

In step S240, the user preferred color temperature managing unit 20 receives the user's preferred color temperatures directly from the user or determines the user's preferred color temperatures according to records on the color temperatures of various visual contents previously selected by the user, generates the determined user's preferred color temperatures, information on each time-divided section, and user's preferred color temperatures of the time-divided sections as second metadata, and outputs the second metadata to the metadata analyzer 31.

A process of determining the user's preferred color temperatures will now be described in detail.

The method of receiving the user's preferred color temperatures directly from the user includes two methods: 1) the user simply inputting the user's preferred color temperatures and 2) presenting examples of images having various color temperatures to the user, receiving an image selected by the user, and determining a color temperature of the selected image as a user's preferred color temperature.

In the method of determining the user's preferred color temperatures according to records on the color temperatures of various visual contents previously selected by the user, after storing records of the user's previously-selected color temperatures of visual contents in database (not shown), when visual contents requested to be currently displayed in an image display device are equal or similar to the visual contents recorded in the database, selected color temperatures of the visual contents recorded in the database are determined as the user's preferred color temperatures of the currently displayed visual contents.

The method of determining the equality or similarity of the visual contents includes a determining method using an identifier for the visual contents and a determining method using color temperatures of the visual contents.

First, in the determining method using the identifier of the visual contents, based on multimedia content-related standards, such as digital broadcast standards, TV-Anytime, MPEG-7, MPEG-21, or the like, an individual visual content is regarded as one digital item to be reclassify according to genre, production history, providers, etc., and the individual visual content has its own identifier.

In the determining method using the identifier, whenever a user's preferred color temperatures are input, the user preferred color temperature managing unit 20 records selected preferred color temperatures of visual contents displayed on the user's terminal in the database together with an identifier of the displayed visual contents. When new visual contents are being viewed, using the identifier received from the metadata analyser 31, the user preferred color temperature managing unit 20 searches the contents of visual contents preveiously recorded in the database having the same identifier or belonging to the same classification, selects color temperatures corresponding to the searched contents, and uses the selected color temperatures as preferred color temperatures for converting color temperatures of the current visual contents. This method is effective when watching visual contents such as news, sports, series, etc., in which similar scenes are repeated.

Next, in the method of using color temperatures of past visual contents, the user's previously selected preferred color temperatures are classified according to primary color temperatures of corresponding visual contents. In other words, when a color temperature of a specific time-divided section of prior-watched visual contents is Ti and a user's selected color temperature is Sj, a pair of color temperatures Ti and Sj are made, granted weight according to their existence frequency or time lengths, and stored in the database. In case where a color temperature estimated in each frame or each time-divided section is U when new visual contents are viewed and a pair of color temperatures U and F(U) of pairs of color temperatures having the highest weight exists in the records of the user's preferred color temperatures, F(U) is determined as a preferred color temperature for color temperature conversion.

Summarizing this, a set of pairs of color temperatures is defined as ST={(Ti, Sj)|Ti=color temperature of watched visual contents, Sj=user's selected preferred color temperature of visual contents having a color temperature Ti}, Wij is defined as the weight that is given to a pair of color temperatures (Ti, Sj), and the weight is determined according to the number of selections related to a pair of corresponding color temperatures or time lengths in which selections of a pair of color temperatures continue. When an estimated color temperature of visual contents that the user wants to watch or when an estimated color temperature of a time-divided section of the visual contents is U and a preferred color temperature automatically selected by the user preferred color temperature managing unit 20 is F(U), F(U) is Sj of the pair of color temperatures (Ti, Sj) which has the maximum weight Wij among the weights Wik {Wik|k=1, 2, ... } when U=Ti or U≈Ti. A color temperature value in a pair of color temperatures can be represented as a color temperature section that is determined by quantizing the whole distribution range of color temperatures.

The user preferred color temperature managing unit 20 records user's preferred color temperatures determined using the above-described methods along with an identifier of current visual contents in the database or records the user's preferred color temperatures as pairs of color temperatures in the database, generates a user's preferred color temperature of each time-divided section of the current visual contents as second metadata, and outputs the second metadata to the metadata analyzer 31.

In step S250, the metadata analyzer 31 analyzes the input second metadata and outputs to the color temperature converter 32 information on a user's preferred color temperature of each time-divided section of the input visual contents along with an estimated color temperature of each time-divided section of the input visual contents analyzed from the first metadata.

Figure 4:
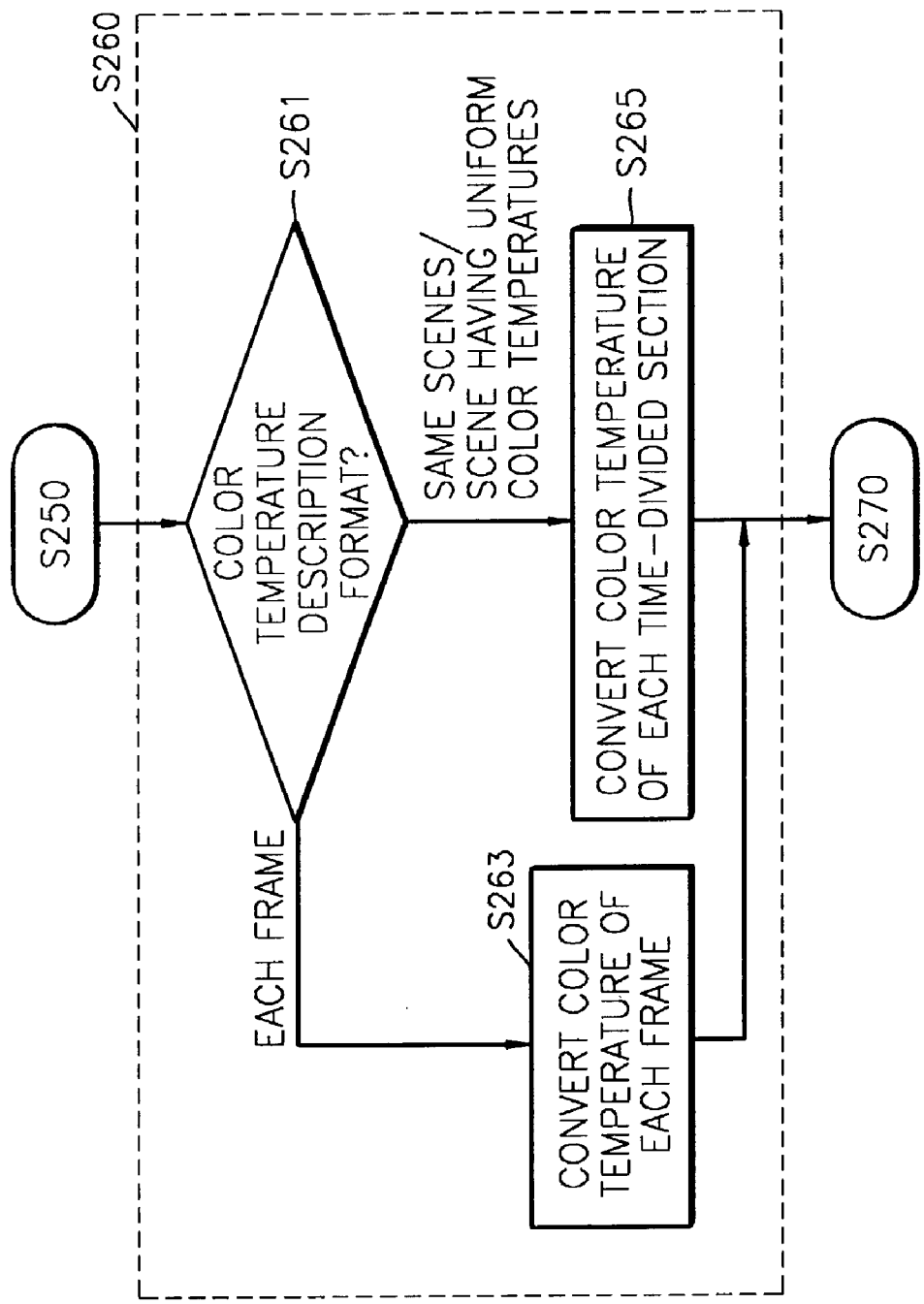
FIG. 4 is a flowchart explaining a color temperature converting process of FIG. 2 in detail.

A color temperature converting process S260 will now be described with reference to FIG. 4.

In step S261, the color temperature converter 32, which received the time-divided section information on the input visual contents, the estimated color temperatures of the time-divided section, the user's preferred color temperatures, and the input visual contents, determines a color temperature description format of the input visual contents.

If the color temperature description format is set to time-divide the input visual contents into frames, in step S263, the color temperature converter 32 converts estimated color temperatures of frames of the input visual contents according to the user's preferred color temperatures. The method of converting color temperatures of the frames is disclosed in detail in Korea Patent Application No. 2001-73288, filed by the applicant of the present invention and incorporated by reference herein. Besides this method, various methods may be applied to the present invention.

Briefly describing the color temperature converting method disclosed in Korea Patent Application No. 2001-73288, when color temperatures used in a television, a monitor, etc., are set to reference color temperatures and user's preferred color temperatures are input, the reference color temperatures are converted to the user's preferred color temperatures. When the set reference color temperatures are converted to the user's preferred color temperatures by a predetermined mapping method, target color temperatures $T_t$ of output visual contents whose estimated color temperatures $T_i$ of frames are converted by the mapping method are obtained, the target color temperatures $T_t$ are converted to CIEXYZ tristimulus values vectors, and a conversion matrix M between two tristimulus values vectors is obtained. RGB values $R_i$, $G_i$, and $B_i$ of each pixel of an input image frame are converted to linear RGB values, converted to CIEXYZ vectors, and arranged according to a conversion matrix M. The CIEXYZ vectors obtained through the application of the converted matrix M are converted to the linear RGB values, the linear RGB values are converted to primary RGB values, and an image having a converted color temperature is output.

Also, by using an estimated reference color value and a target reference color value in a color temperature converting method disclosed in Korean Patent Application No. 1999-50596, filed by the applicant of the present invention, respectively corresponding to the estimate color temperature and the user's preferred color temperature of the present invention, the color temperature converting method according to the present invention may be performed.

If the color temperature description format is set to time-divide the input image into identical scenes or scenes having uniform color temperatures, in step S265, the color temperature converter 32 converts estimated representative color temperatures of all frames in time-divided sections according to the input user's preferred color temperatures.

The method of converting color temperatures of the frames in the time-divided sections is identical to the method of converting the color temperature of each frame.

In step S270, visual contents in each time-divided section having converted color temperatures are output as output visual contents to the user's image display device.

According to the present invention, in the process of converting color temperatures of visual contents to user's preferred color temperatures, before the visual contents are displayed in an image display device of a user's terminal, the color temperatures of the visual contents are estimated and recorded as metadata. Next, when requesting the visual contents to be displayed in the image display device, the estimated color temperatures recorded in corresponding metadata are used for color temperature conversion. As a result, calculation load in the image display device, which is caused by the color temperature estimating process being performed when the visual contents are displayed in the image display device, or the cost of improving the performance of the image display device can be remarkably reduced.

Also, when determining and recording the user's preferred color temperatures, a preferred color temperature of each of visual contents that the user has previously watched is recorded so as to be applied to the conversion of color temperatures of visual contents that the user is now watching. As a result, adaptive color temperature conversion can be performed for each of the visual contents.

The color temperature converting method of the present invention can be realized as computer-readable code in a computer-readable recording medium. The computer-readable recording medium includes all kinds of recording apparatuses which store computer system-readable data. The computer-readable recording medium includes ROMs, RAMs, CD-ROMs, magnetic tapes, floppy discs, optical data storing apparatuses, etc., and also apparatuses that are realized in a form of carrier waves (e.g., transmission via the Internet). Also, the computer-readable recording medium can store and execute computer-readable codes that are distributed in computer systems, which are connected to one another via a network.

While this invention has been particularly shown and described with reference to preferred embodiments thereof, it will be understood by those skilled in the art that various changes in form and details may be made therein without departing from the spirit and scope of the invention as defined by the appended claims. Therefore, the described embodiments must be considered within a descriptive range not a restricted range. The scope of the present invention must be defined by the appended claims, not the above-described embodiments, and all differences within a range equivalent to the scope of the present invention must be construed as being included in the present invention.

What is claimed is:

1. A system for converting color temperatures of visual contents to user's preferable color temperatures, the system comprising:
   an image color temperature recording unit that time-divides the visual contents according to a color temperature description format, estimates color temperatures of time-divided sections, and records the estimated color temperatures as first metadata;
   a user preferable color temperature managing unit that determines user's preferable color temperatures of the time-divided sections based on the similarity between said visual contents and previously viewed time-divided sections having user selected color preferences associated therewith, records the user's preferable color temperatures as second metadata, and outputs the user's preferable color temperatures; and
   a color temperature adjusting unit that converts the estimated color temperatures of the first metadata based on the user's preferable color temperatures of the second metadata.

2. The system of claim 1, wherein the image color temperature recording unit comprises:
   a color temperature estimator that time-divides the visual contents according to a color temperature description format and estimates representative color temperatures of time-divided sections; and
   a metadata generator that records time-divided section information of the visual contents and the estimated color temperatures of the time-divided sections that are received from the color temperature estimator according to a predetermined format.

3. The system of claim 2, wherein the color temperature estimator measures color temperatures of a predetermined number of frames in the time-divided sections of the visual contents and estimates the average of the measured color temperatures as a representative color temperature of each time-divided section.

4. The system of claim 2, wherein the visual contents are time-divided according to the color temperature description format into frames of the visual contents, same scenes composed of a plurality of temporarily successive frames representing same scenes, or uniform color temperature scenes composed of a plurality of frames having uniform color temperatures within a predetermined range in the visual contents.

5. A system for converting color temperatures of visual contents to user's preferable color temperatures, the system comprising:
   an image color temperature recording unit that time-divides the visual contents according to a color temperature description format, estimates color temperatures of time-divided sections, and records the estimated color temperatures as first metadata;
   a user preferable color temperature managing unit that determines user's preferable color temperatures of the time-divided sections, including a database in which pairs of color temperatures composed of the estimated color temperatures of the time-divided sections and user's preferable color temperatures and an identifier of the visual contents are recorded, determines user's preferable color temperatures of the time-divides sections by using the pairs of color temperatures and the identifier extracted from the database, records the user's preferable color temperatures as second metadata, and outputs the second metadata; and
   a color temperature adjusting unit that converts the estimated color temperatures of the first metadata based on the user's preferable color temperatures of the second metadata.

6. The system of claim 5, wherein the user preferable color temperature managing unit determines the user's preferable color temperatures by one of a method of determining preferable color temperatures by receiving preferable color temperatures from the user, a method of receiving the identifier of the visual contents from the color temperature adjusting unit, extracting user's selected preferable color temperatures of visual contents having an identifier belonging to the same classification as the identifier of the visual contents from the database, and determining the user's selected preferable color temperatures as preferable color temperatures of the visual contents, and a method of receiving the estimated color temperatures of the time-divided sections of the visual contents from the color temperature adjusting unit and determining preferable color temperatures of a pair of color temperatures of the pairs of color temperatures recorded in the database having estimated color temperatures similar to the estimated color temperatures of the visual contents as preferable color temperatures of the visual contents.

7. The system of claim 5, wherein the image color temperature recording unit comprises:
a color temperature estimator that time-divides the visual contents according to the color temperature description format and estimates representative color temperatures of the time-divided sections; and
a metadata generator that records time-divided section information of the visual contents and the estimated color temperatures of the time-divided sections that are received from the color temperature estimator as the first metadata.

8. A system for converting color temperatures of visual contents to user's preferable color temperatures, the system comprising:
an image color temperature recording unit that time-divides the visual contents according to a color temperature description format, estimates color temperatures of time-divided sections, and records the estimated color temperatures as first metadata;
a user preferable color temperature managing unit that determines user's preferable color temperatures of the time-divided sections, records the user's preferable color temperatures as second metadata, and outputs the user's preferable color temperatures; and
a color temperature adjusting unit comprising:
a metadata analyzer that analyzes the first metadata to output the time-divided section information of the visual contents and the estimated color temperatures of the time-divided sections to the user preferable color temperature managing unit and analyzes the second metadata to output the user's preferable color temperatures of the time-divided sections; and
a color temperature converter that receives the visual contents, receives the time-divided section information, the estimated color temperatures of the time-divided sections, and the preferable color temperatures of the time-divides sections from the metadata analyzer, and converts the estimated color temperatures of the time-divided sections of the visual contents based on the user's preferable color temperatures.

9. The system of claim 1, wherein the visual contents are time-divided according to the color temperature description format into frames of the visual contents, same scenes composed of a plurality of temporarily successive frames representing same scenes, or uniform color temperature scenes composed of a plurality of frames having uniform color temperatures within a predetermined range in the visual contents.

10. A method of converting color temperatures of visual contents to user's preferable color temperatures, the method comprising:
(a) time-dividing the visual contents according to a color temperature description format and estimating color temperatures of time-divided sections;
(b) recording the estimated color temperatures and information about the time-divided sections as first metadata;

(c) analyzing the first metadata, determining user's preferable color temperatures of the time-divided sections based on analyzed estimated color temperatures and the information about the time-divided sections, and recording the information about the time-divided sections and the user's preferable color temperatures of the time-divided sections as second metadata; and
(d) analyzing the second metadata and converting the estimated color temperatures of the time-divided sections of the visual contents based on the user's preferable color temperatures of the time-divided sections.

11. The method of claim 10, wherein step (c) comprises recording pairs of color temperatures composed of the estimated color temperatures of the time-divided sections and the user's preferable color temperatures and an identifier of the visual contents in database.

12. The method of claim 10, wherein in step (a), the visual contents are time-divided into frames of the visual contents, same scenes composed of a plurality of temporarily successive frames representing same scenes, or uniform color temperature scenes composed of a plurality of frames having uniform color temperatures within a predetermined range.

13. The method of claim 10, wherein in step (a), color temperatures of a predetermined number of frames in the time-divided sections of the visual contents are estimated and the average of the estimated color temperatures is estimated as a representative color temperature of each time-divided section.

14. The method of claim 10, wherein in step (c), the user's preferable color temperatures are determined by one of a method of determining preferable color temperatures by receiving preferable color temperatures from the user, a method of receiving the identifier of the visual contents, extracting user's selected preferable color temperatures of visual contents having an identifier belonging to the same classification as the identifier of the visual contents from the database, and determining the user's selected preferable color temperatures as preferable color temperatures of the visual contents, and a method of receiving the estimated color temperatures of the time-divided sections of the visual contents and determining preferable color temperatures of a pair of color temperatures of the pairs of color temperatures recorded in the database having estimated color temperatures similar to the estimated color temperatures of the visual contents as preferable color temperatures of the visual contents.

15. A recording medium on which the method of claim 10 is recorded as a program code that can be executed in a computer.

16. A method of converting a color temperature of an image to a user's preferable color temperature, the method comprising:
(a) obtaining a color temperature of an input image;
(b) receiving a user's preferable color temperature;
(c) obtaining a target color temperature through a mapping between the obtained color temperature of the input image and the user's preferable color temperature;
(d) obtaining a conversion matrix of color temperature using the obtained color temperature of the input image and the target color temperature; and
(e) converting chromaticity values of the input image to chromaticity values in which the user's preferable color temperature is reflected by multiplying a chromaticity value of each pixel in the input image by the conversion matrix of color temperature.

17. A computer-readable recording medium, on which a program enabling the method of claim 16 is recorded.

18. A system for converting a color temperature of an image to a user's preferable color temperature, the system comprising:

an image color temperature recording unit that obtains a color temperature of an input image;

a user preferable color temperature managing unit that receives a user's preferable color temperature;

a color temperature adjusting unit that obtains a target color temperature through a mapping between the obtained color temperature of the input image and the user's preferable color temperature, obtains a conversion matrix of color temperature using the obtained color temperature of the input image and the target color temperature, and converts chromaticity values of the input image to chromaticity values in which the user's preferable color temperature is reflected, by multiplying a chromaticity value of each pixel in the input image by the conversion matrix of color temperature.

* * * * *